A. E. PARNALL.
WORM AND SCREW CONSTRUCTION.
APPLICATION FILED SEPT. 18, 1916.
1,231,643. Patented July 3, 1917.
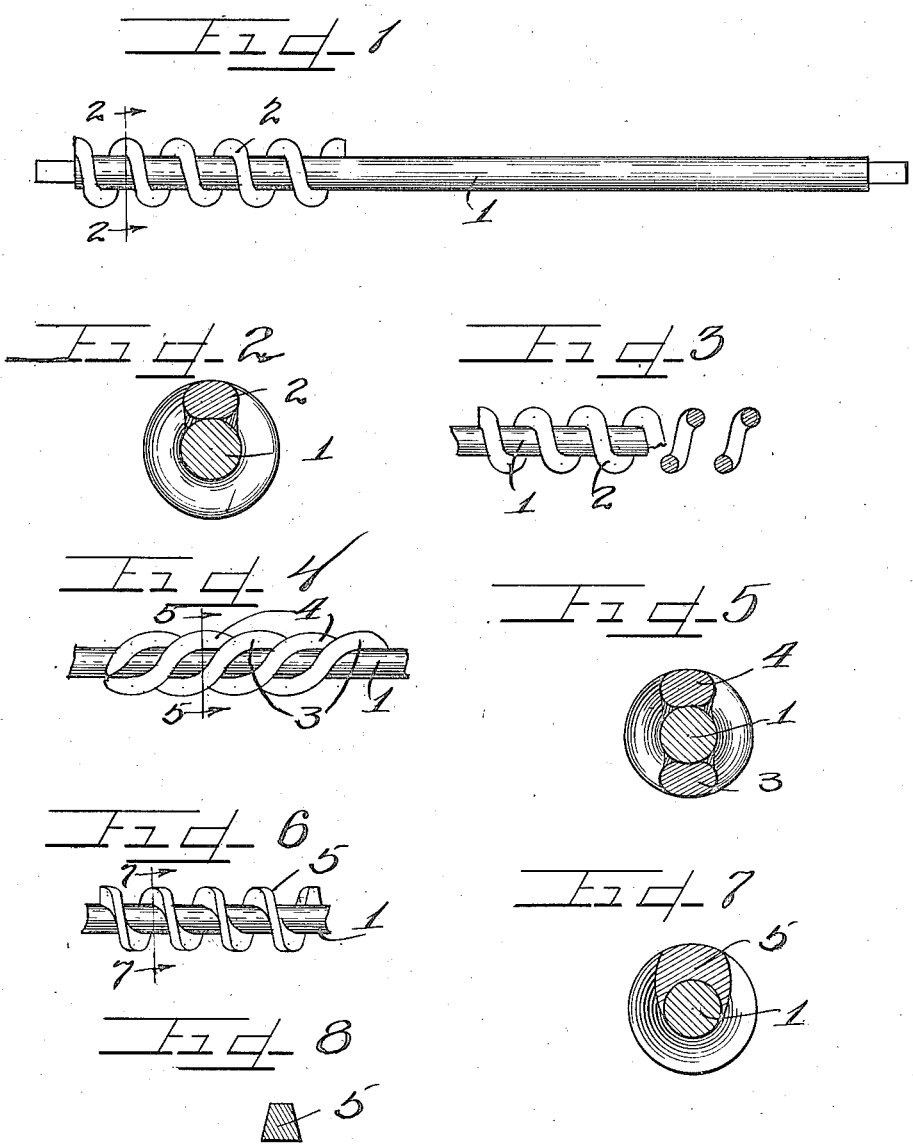

UNITED STATES PATENT OFFICE.

ARCHIE E. PARNALL, OF CHICAGO, ILLINOIS, ASSIGNOR TO FRANK W. WILLIAMS, OF CHICAGO, ILLINOIS.

WORM AND SCREW CONSTRUCTION.

1,231,643.  Specification of Letters Patent.  Patented July 3, 1917.

Application filed September 18, 1916. Serial No. 120,817.

*To all whom it may concern:*

Be it known that I, ARCHIE E. PARNALL, a citizen of the United States, and a resident of the city of Chicago, in the county of Cook and State of Illinois, have invented certain new and useful Improvements in a Worm and Screw Construction; and I do hereby declare that the following is a full, clear, and exact description of the same, reference being had to the accompanying drawings, and to the numerals of reference marked thereon, which form a part of this specification.

This invention relates to a means of construction of a worm or screw element for use in small mechanisms or light load machinery. By this invention, a worm of any desired pitch or size within certain ranges may be easily produced at small cost, and the character or shape of the worm or screw threads may take many different forms without change or appreciable effect upon the cost or method of production.

It is an object of this invention to provide an improved construction of a worm or screw by mounting a spiral or helical element upon a shaft spindle, and securing the same rigidly thereto.

It is also an object of this invention to construct a worm or screw by forming a helical element of the desired pitch and depth and engaging the same over a spindle to which the same is then held secured, either due to the inherent resiliency of the helical element itself whereby the same clamps securely by friction on the spindle, or by soldering or brazing the helical element thereto.

It is furthermore an important object of this invention to construct a worm or screw mechanism wherein a helical element of any desired pitch and configuration is first formed from suitable material and then engaged over a shaft pintle to which it is secured in any suitable manner, thus affording a cheap and simple method of manufacture not requiring expensive screw cutting processes.

It is finally an object of this invention to provide an improved construction of worm or screw thread mechanism wherein a helically bent element is engaged over a shaft or spindle and secured thereto.

The invention (in a preferred form) is illustrated in the drawings and hereinafter more fully described.

On the drawings:

Figure 1, is a side elevation of a screw or worm shaft constructed according to the principles of my invention.

Fig. 2, is a section on line 2—2, of Fig. 1.

Fig. 3, is a fragmentary view partly broken away and partly shown in section illustrating the construction.

Fig. 4, is a view similar to Fig. 1, illustrating a worm or screw shaft having a double-thread thereon.

Fig. 5, is a detail section on line 5—5, of Fig. 4.

Fig. 6, is a fragmentary view similar to Fig. 1, showing a screw or worm shaft having a thread element mounted thereon of different configuration.

Fig. 7, is a detail section taken on line 7—7, of Fig. 6.

Fig. 8, is a transverse cross-section of the thread element of Fig. 6.

As shown in the drawings:

The reference numeral 1, indicates a shaft or spindle and secured therearound at one end thereof is a helical coil of steel wire or other material denoted by the reference numeral 2, which is, as clearly shown in Fig. 3, of circular section. Said helical coil 2, may be secured upon the spindle 1, in any suitable manner either by soldering or brazing, or may retain its assembled relation therewith due to a clamping effect owing to the inherent resiliency of the coils. When held secured in the latter manner, the coil 2, is first sprung to an increased interior diameter by mechanism tending to unwind the coil after which the spindle 1, is inserted therethrough, and the coil is then released and springs inwardly thereby clamping securely upon said spindle 1. Another method of attachment of the helical coil upon the spindle so that the same forms a series of screw or worm threads thereon is to rotate the spindle 1, and feed the wire thereto thus spinning the thread thereon and the brazing or soldering may be performed simultaneously with the winding operation, or subsequently thereto.

In Figs. 4 and 5, I have shown the spindle 1, provided with a double thread due to the use of two coils 3 and 4, respectively, which are of circular section, and it is obvious that any number of coils may be used to provide any desired number of threads upon the spindle.

In Figs. 6, 7 and 8, I have shown a helical coil 5, associated with the spindle 1, which is of different configuration from the coils 3 and 4, respectively, shown in the previous construction, in that the coil, on its inner periphery is curved conforming to the cylindrical periphery of the spindle 1, as shown in the sectional view in Fig. 7.

This method of construction of a worm or screw shaft permits this type of mechanism to be easily and cheaply manufactured in many different sizes and forms, and is, of course, particularly adapted for use in small mechanisms where only light loads are carried, as for instance, on governor shafts of spring motors and other devices similar to those used in talking machines and other like mechanisms.

I am aware that the details of construction may be varied through a wide range without departing from the principles of this invention, and I therefore do not purpose limiting the patent granted otherwise than necessitated by the prior art.

I claim as my invention:

A screw or worm thread device, comprising a spindle, and a helical coil sprung thereon and retained by its elasticity.

In testimony whereof I have hereunto subscribed my name in the presence of two subscribing witnesses.

ARCHIE E. PARNALL.

Witnesses:
CHARLES W. HILLS, Jr.,
EARL M. HARDINE.